United States Patent
Dong et al.

(10) Patent No.: US 11,181,783 B2
(45) Date of Patent: Nov. 23, 2021

(54) DISPLAY PANEL, DISPLAY DEVICE AND TERMINAL

(71) Applicant: BOE Technology Group Co., Ltd., Beijing (CN)

(72) Inventors: Xue Dong, Beijing (CN); Xinxing Wang, Beijing (CN); Liwei Liu, Beijing (CN); Yinglong Huang, Beijing (CN); Jaegeon You, Beijing (CN); Yunsik Im, Beijing (CN); Hyunsic Choi, Beijing (CN); Heecheol Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,957

(22) PCT Filed: Oct. 17, 2018

(86) PCT No.: PCT/CN2018/110711
§ 371 (c)(1),
(2) Date: Feb. 28, 2020

(87) PCT Pub. No.: WO2019/114411
PCT Pub. Date: Jun. 20, 2019

(65) Prior Publication Data
US 2020/0192137 A1    Jun. 18, 2020

(30) Foreign Application Priority Data

Dec. 15, 2017   (CN) .......................... 201711350886.2

(51) Int. Cl.
G02F 1/133     (2006.01)
G02F 1/1339    (2006.01)
G02F 1/1362    (2006.01)

(52) U.S. Cl.
CPC ...... *G02F 1/1339* (2013.01); *G02F 1/136209* (2013.01); *G02F 1/136286* (2013.01); *G02F 1/13396* (2021.01)

(58) Field of Classification Search
CPC ............. G02F 1/1339; G02F 1/136209; G02F 1/136286; G02F 1/13396
(Continued)

(56) References Cited

U.S. PATENT DOCUMENTS

2007/0216847 A1   9/2007  Tsung-Chien et al.
2015/0253607 A1   9/2015  Cho
(Continued)

FOREIGN PATENT DOCUMENTS

CN    105446021 A    3/2016
CN    106094359 A    11/2016
(Continued)

OTHER PUBLICATIONS

First office action of Chinese application No. 201711350886.2 dated Apr. 2, 2020.
(Continued)

*Primary Examiner* — Nathanael R Briggs
*Assistant Examiner* — William D Peterson
(74) *Attorney, Agent, or Firm* — Fay Sharpe LLP

(57) ABSTRACT

A display panel is provided. The display panel includes a first substrate faces a second substrate. The first substrate includes a plurality of first spacers and a plurality of second spacers. The second substrate includes a corresponding plurality of first protrusions and a plurality of second protrusions. A sum of a height of the first protrusion and a height of the first spacer is greater than that of the second spacer. Each of the first spacers includes at least one protrusion. A length of an orthographic projection of each protrusion on a plane of the first substrate is longer in one direction.

19 Claims, 9 Drawing Sheets

(58) Field of Classification Search
USPC .......................................................... 349/56
See application file for complete search history.

(56) References Cited

U.S. PATENT DOCUMENTS

2016/0085105  A1    3/2016   Jeon et al.
2019/0033644  A1    1/2019   Wang et al.

FOREIGN PATENT DOCUMENTS

CN      206209256  U          5/2017
CN      107219955  A    *     9/2017
CN      107219955  A          9/2017
JP      2016151744 A          8/2016

OTHER PUBLICATIONS

International search report of PCT application No. PCT/CN2018/110711 dated Jan. 3, 2019.

* cited by examiner

DISPLAY PANEL, DISPLAY DEVICE AND TERMINAL

CROSS-REFERENCE TO RELATED APPLICATION

This application is a 371 of PCT Application No. PCT/CN2018/110711, filed on Oct. 17, 2018, which claims priority to Chinese Patent Application No. 201711350886.2, filed on Dec. 15, 2017 and entitled "Display Panel and Display Device", the entire contents of which are incorporated herein by reference.

TECHNICAL FIELD

The present disclosure relates to a display panel, a display device and a terminal.

BACKGROUND

With the continuous development of display technology, liquid crystal displays (LCDs) have become mainstream display devices due to their fast response, high integration, and low power consumption. In the liquid crystal cell of the liquid crystal display panel, in order to maintain the uniformity of the cell gap of the cell at various positions, a post spacer (PS) may be disposed between an array substrate and an opposite substrate. The post spacer can function to support the liquid crystal cell, thereby maintaining the cell gap of the liquid crystal display panel stable and uniform.

SUMMARY

The present disclosure provides a display panel, a display device, and a terminal.

In an aspect, a display panel is provided. The display panel comprises a first substrate and a second substrate;

wherein a side of the first substrate in a thickness direction faces a side of the second substrate in a thickness direction, the first substrate comprises a plurality of first spacers and a plurality of second spacers on a side facing the second substrate, a height of the first spacer being smaller than a height of the second spacer;

the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than the height of the second spacer; and each of the first spacers comprises at least one protrusion, and a length of an orthographic projection of each of the at least one protrusion on a plane of the first substrate in one direction is longer than lengths thereof in other directions.

Optionally, the length of the orthographic projection of each of the at least one protrusion on the plane of the first substrate in a target direction is longer than lengths thereof in other directions, the target direction is a direction away from a reference region, the orthographic projection of each of the at least one protrusion on the plane of the first substrate is of a shape radiating along the target direction, and the reference region is a region where an orthographic projection of the first boss corresponding to the first spacer on the plane of the first substrate is.

Optionally, the orthographic projection of each of the at least one protrusion on the plane of the first substrate is aligned with an edge of the reference region in a direction perpendicular to the target direction.

Optionally, the display panel comprises a plurality of panel regions on a plane of the display panel, and target directions of any two protrusions in any one of the panel regions are different.

Optionally, the number of types of the target directions of the protrusions in any one of the panel regions is n, and an angle between each adjacent two of the target directions is 360/n degrees, where n is greater than 2.

Optionally, the number of the first spacers in each of the panel regions is greater than 2, and the number of the protrusions in each of the first spacers is 1.

Optionally, the number of the first spacers in each of the panel regions is 1, and the number of protrusions in the first spacer in each of the panel regions is greater than 2.

Optionally, in at least one of the first spacers, the orthographic projection of each of the at least one protrusion on the plane of the first substrate is of a shape radiating outward from an inside of the reference region along the target direction;

in at least one of the first spacers, the orthographic projection of each of the at least one protrusion on the plane of the first substrate is of a shape radiating from an outside of the reference region along the target direction.

Optionally, the plurality of first spacers have the same shape and size, and the plurality of first spacers are equally spaced in each direction.

Optionally, a plane of the display panel comprises a plurality of sub-pixel regions, and each of the sub-pixel regions has at most one reference region of the first spacer.

Optionally, one of the first substrate and the second substrate is provided with a plurality of rows of gate lines and a plurality of columns of data lines, the plurality of first spacers are arranged in a plurality of rows in an arrangement direction of the gate lines, and the plurality of first spacers are arranged in a plurality of columns in an arrangement direction of the data lines.

Optionally, a plane of the display panel comprises a plurality of sub-pixel regions, and each of the sub-pixel regions has at most one reference region of the first spacer.

Optionally, each of the second spacers is surrounded by more than one of the first spacers.

Optionally, a plane of the display panel comprises a plurality of sub-pixel regions, each of the sub-pixel regions comprises a gate line region and a transistor region; each of the first spacers comprising more than two of the protrusions corresponds to the first bosses within the gate line region and outside the transistor region.

Optionally, the orthographic projection of each of the at least one protrusion on the plane of the first substrate is an ellipse.

Optionally, the display panel further comprises a black matrix layer, the black matrix layer is on one of the first substrate and the second substrate; an orthographic projection region of each of the first spacers and an orthographic projection region each of the second spacers on a plane of the display panel are within an orthographic projection region of the black matrix layer on the plane of the display panel.

Optionally, set positions of the plurality of first spacers in a plane of the display panel are equally spaced in each direction, the set position is a center of a graphic formed by an orthographic projection of the first spacer and an orthographic projection of the corresponding first boss on the plane of the display panel.

Optionally, the length of the orthographic projection of each of the at least one protrusion on the plane of the first substrate in a target direction is longer than lengths thereof in other directions, the target direction is a direction away from a reference region, the orthographic projection of each of the at least one protrusion on the plane of the first substrate is of a shape radiating along the target direction, and the reference region is a region where an orthographic projection of the first boss corresponding to the first spacer on the plane of the first substrate is;

the orthographic projection of each of the at least one protrusion on the plane of the first substrate is aligned with an edge of the reference region in a direction perpendicular to the target direction;

the display panel of claim comprises a plurality of panel regions on a plane of the display panel, and target directions of any two protrusions in any one of the panel regions are different;

the number of types of the target directions of the protrusions in any one of the panel regions is n, and an angle between each adjacent two of the target directions is 360/n degrees, where n is greater than 2;

the orthographic projection of each of the at least one protrusion on the plane of the first substrate is an ellipse;

in at least one of the first spacers, the orthographic projection of each of the at least one protrusion on the plane of the first substrate is of a shape radiating outward from an inside of the reference region along the target direction; and in at least one of the first spacers, the orthographic projection of each of the at least one protrusion on the plane of the first substrate is of a shape radiating from an outside of the reference region along the target direction.

In another aspect, a display device is provided. The display device comprises a display panel. The display panel comprises a first substrate and a second substrate; wherein a side of the first substrate in a thickness direction faces a side of the second substrate in a thickness direction;

the first substrate comprises a plurality of first spacers and a plurality of second spacers on a side facing the second substrate, a height of the first spacer being smaller than a height of the second spacer;

the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than a height of the second spacer; and each of the first spacers comprises at least one protrusion, and a length of an orthographic projection of each of the at least one protrusion on a plane of the first substrate in one direction is longer than lengths thereof in other directions.

In yet another aspect, a terminal is provided. The terminal comprises a display panel, and the display panel comprises a first substrate and a second substrate; wherein a side of the first substrate in a thickness direction faces a side of the second substrate in a thickness direction;

the first substrate comprises a plurality of first spacers and a plurality of second spacers on a side facing the second substrate, a height of the first spacer being smaller than a height of the second spacer;

the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than a height of the second spacer; and each of the first spacers comprises at least one protrusion, and a length of an orthographic projection of each of the at least one protrusion on a plane of the first substrate in one direction is longer than lengths thereof in other directions.

DETAILED DESCRIPTION

The embodiments of the present disclosure will be described below in conjunction with the accompanying drawings. It is obvious that the described embodiments are a part rather than all of the embodiments of the present disclosure. All other embodiments obtained by those of ordinary skill in the art based on the embodiments of the present disclosure without creative work are within the scope of protection of the present disclosure. Unless otherwise defined, technical terms or scientific terms used in the present disclosure shall be of ordinary meaning understood by those of ordinary skill in the art to which the present disclosure pertains. The term "first", "second", or a similar term used in the present disclosure does not denote any order, quantity, or importance, but is merely used to distinguish different components. The term "comprising" or a similar term means that elements or items which appear before the term include the elements or items listed after the term and their equivalents, and do not exclude other elements or items. The term "connection" or "connected to" or a similar term is not limited to a physical or mechanical connection but may include an electrical connection that may be direct or indirect.

In the liquid crystal cell of the liquid crystal display panel, in order to maintain the uniformity of the cell gap of the cell at various positions, a post spacer may be disposed between the array substrate and the opposite substrate. The post spacer can function to support the liquid crystal cell, thereby maintaining the cell gap of the liquid crystal display panel stable and uniform. When the upper and lower substrates of the liquid crystal cell of the liquid crystal display panel are displaced by an external force, the spacer may scratch the alignment film on the inner wall of the liquid crystal cell, and the liquid crystal molecules at the position may not be properly aligned to cause light leakage or the like. Although a black matrix layer can be extended to a region that is easily scratched to make the light leakage invisible, this method may reduce the pixel aperture ratio (The aperture ratio may be deemed as the ratio of the area of an effective light-emitting region to the whole area) and causes a loss of light transmittance of the entire display panel.

Figure 1:
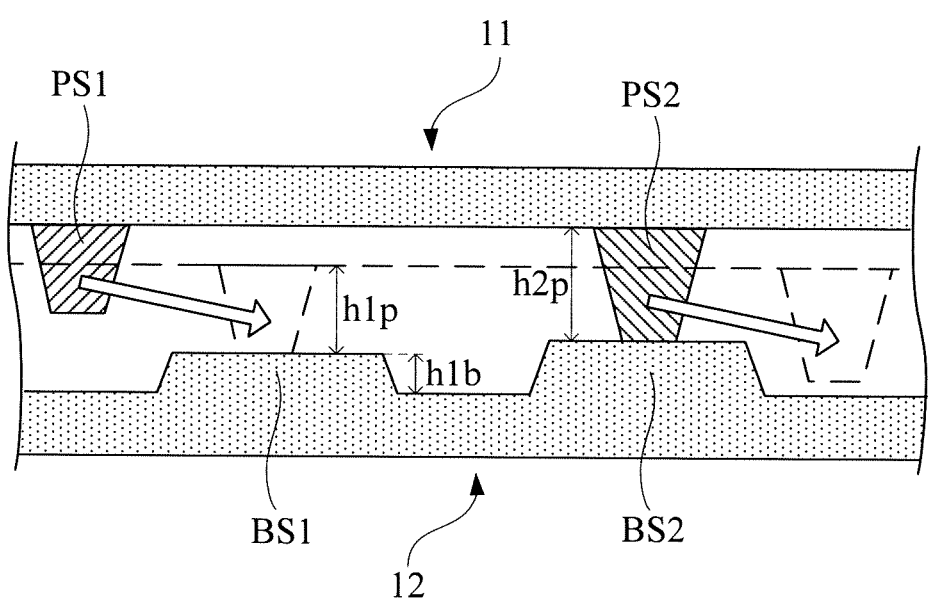
FIG. 1 is a structural schematic diagram of a display panel in a thickness direction according to embodiments of the present disclosure.

FIG. 1 is a schematic structural view of a display panel in a thickness direction according to an embodiment of the present disclosure. Referring to FIG. 1, the display panel includes a first substrate 11 and a second substrate 12. A side of the first substrate 11 in a thickness direction (a lower side in FIG. 1, hereinafter referred to a first side) faces a side of the second substrate (an upper side in FIG. 1, hereinafter referred to a second side) in a thickness direction. Moreover, the first substrate 11 includes a plurality of first spacers PS1 and a plurality of second spacers PS2 on a side facing the second substrate 12. The second substrate 12 includes a plurality of first bosses BS1 and a plurality of second bosses BS2 on a side facing the first substrate 11. Each of the first spacers PS1 corresponds to at least one first boss BS1 respectively (there may be one or more first bosses BS1 providing support for each of the first spacers PS1, with one first boss in FIG. 1 as an example). Each of the second spacers PS2 faces one second boss BS2 respectively. Further, a sum of a height h1$b$ of the first boss BS1 and a height h1$p$ of the first spacer is greater than a height h2$p$ of the second spacer.

In the display panel illustrated in FIG. 1, each of the first spacers PS1 includes at least one protrusion PS1$x$. The length of the orthographic projection of each protrusion PS1$x$ on the plane of the first substrate 11 in one direction (This direction may be predetermined direction, and is the major axis direction R1 in FIG. 2) is longer than lengths thereof in other directions. That is, the protrusion PS1$x$ is longer in a direction. In this structure, the first spacer PS1$x$ and the first boss BS1 can make the first substrate 11 and the second substrate be staggered in the target direction, to prevent the second spacer PS2 from scratching the substrates.

Figure 2:
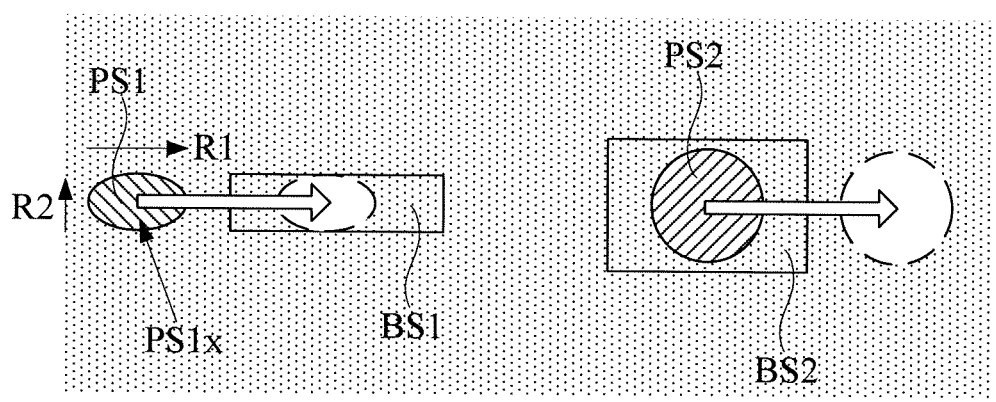
FIG. 2 is a schematic diagram of the structure shown in FIG. 1 in a top view direction.

Optionally, the shape of an orthographic projection of each protrusion PS1$x$ on a plane of the first substrate 11 is a shape radiating toward the outside of the reference region of the first spacer PS1. The reference region of any one of the first spacers PS1 is an orthographic projection region of the first boss BS1 corresponding to the first spacer PS1 on the plane of the first substrate 11. That is, the length of the orthographic projection of each protrusion PS1$x$ on the plane of the first substrate 11 in the target direction is longer than lengths thereof in other directions other than the target direction. The target direction is a direction away from the reference region. FIG. 2 is a schematic illustration of the structure of FIG. 1 in an overlook direction. Referring to FIG. 2, the reference region of the first spacer PS1 shown in FIG. 1 overlaps a disposed region of the first boss BS1 in FIG. 2. The first spacer PS1 is formed by a protrusion PS1$x$ whose orthographic projection is an ellipse. It should be noted that the shape of the orthographic projection of the protrusion PS1$x$ on the plane of the first substrate 11 is a shape in which the lengths in a major axis direction R1 and a minor axis direction R2 are different. The orthographic projection of the protrusion PS1$x$ can be regarded as extending in a direction away from the reference region of the first spacer PS1 from right to left (i.e., the extending direction is a right-to-left direction in FIG. 2, and the extending direction is the same as or is parallel to the target direction of the first spacer PS1). The shape of the orthographic projection of the protrusion PS1$x$ may also be regarded as a shape radiating from the outside of the reference region along a direction away from the reference region.

Referring to FIG. 1 and FIG. 2, in one example, the display panel in a general state (the general state is a state in which the first substrate and the second substrate are not staggered) obtains internal support in the thickness direction through the relative contact between the second spacer PS2 and the second boss BS2, so that the distance between the first substrate 11 and the second substrate 12 is maintained. For example, the pressure generated by the second spacer PS2 in FIG. 1 and FIG. 2 abutting against the second boss BS2 maintains the distance between the two substrates. At this time, the first spacer PS1 and the first boss BS1 are separated and misaligned from each other. When a misalignment occurs between the first substrate 11 and the second substrate 12 inside the display panel, the display substrate can be internally supported in the thickness direction by the relative contact between the first spacer PS1 and the first boss BS1, and the distance between the first substrate 11 and the second substrate 12 is maintained. For example, in FIG. 1 and FIG. 2, the state in which the first substrate 11 is misaligned along the one-direction arrow is shown by a dashed line. The pressure generated by the first spacer PS1 abutting against the first boss BS1 after the misalignment maintains the spacing between the two substrates. At the same time, the second spacer PS2 and the second boss BS2 are separated from each other and misaligned from each other, and the second spacer PS2 and the second side surface of the second substrate 12 are separated from each other.

It can be seen that, based on the structure of the display panel, when a relative displacement occurs between the first substrate 11 and the second substrate 12, the first spacer PS1 having at least one protrusion PS1$x$ can be in contact with the first boss BS1 opposite, thereby, in replacement of the second spacer PS2, providing support between the first substrate 11 and the second substrate 12, and helping prevent the second spacer PS2 from contacting other part than the second boss B2 on the second substrate 12. In one example, when the display panel is a liquid crystal display panel, and an alignment film for aligning liquid crystal molecules is disposed on a second side surface of the second substrate 12, the embodiments of the present disclosure help avoid light leakage, etc. caused by the alignment film being scratched by the spacer, which helps improve the reliability of the related display products.

Optionally, both the first boss BS1 and the second boss BS2 refer to a protruded part with a certain height relative to the surroundings on the second side surface of the second substrate 12, which may be a part of the second substrate 12 itself or may also be formed through, for example, a method of setting up a cushion layer and the like. Its top surface may be flat or rough, as long as it meets the contact requirement of the corresponding spacer.

Optionally, "relative" between the second spacer PS2 and the second boss BS2 refers to that at least a portion of the area of the second spacer PS2 faces a portion of the area of the second bosses BS2 when the first substrate 11 and the second substrate 12 are not misaligned. The "correspondence" between the first spacer PS1 and the first boss BS1 means that in the situation where no misalignment occurs and in all possible misalignment situations, at least a portion of the area of the first spacer PS1 faces a portion of the area of the first boss BS1 in at least some situations. Optionally, the spacing between the orthographic projections of the first spacer PS1 and the first boss BS1 corresponding to each other in the plane of the display panel is less than a certain limit. For example, for the application scenario in which the misalignment between the first substrate 11 and the second substrate 12 is not more than 40 micrometers, the spacing between the orthographic projections of the first spacers PS1 and the first bosses BS1 corresponding to each other in the plane of the display panel is less than 35 microns.

Optionally, the projected shape of the protrusion PS1x on the plane of the display panel may be any shape whose orthographic projection length in one direction is larger than in any other directions. The projected shape of any one of the orthographic protrusions PS1x on the plane of the display panel may be, for example, a rectangle, a diamond, a trapezoid, a triangle, a semicircle, a semi-ellipse, or the like, in addition to an ellipse. Compared with other shapes, the elliptical protrusion PS1x has the characteristics of smooth surface, stable structure, and easy for fabrication. "Radiating toward the outside of the reference region" means that the distance between each position, where the orthographic protrusion PS1x is projected at, in the extending direction and the reference region is different, and at least a portion of the orthographic projection of the protrusion PS1x may be located outside the reference region.

Depending on the difference in the direction and size of the orthographic projection of the protrusion PS1x, the misalignment situation in which the desired supporting effect can be achieved is also different. For example, for the first spacer PS1 shown in FIG. 1 and FIG. 2, if the length of the first boss BS1 is 60 μm in the left-right direction in FIG. 2, the length of the first spacer PS1 is 20 μm in the left-right direction, and the spacing between the first spacer PS1 and the first boss BS1 is 10 um in the non-misaligned state, then the first spacer PS1 can only achieve the desired supporting effect when the misalignment distance of the first substrate 11 relative to the second substrate 12 is greater than 10 um and less than 90 um in the direction indicated by the one-direction arrow. In a practical application scenario, the shape, size, and arrangement method of the first spacers PS1 may be set according to the misalignment situation that needs to be handled.

Figure 3:
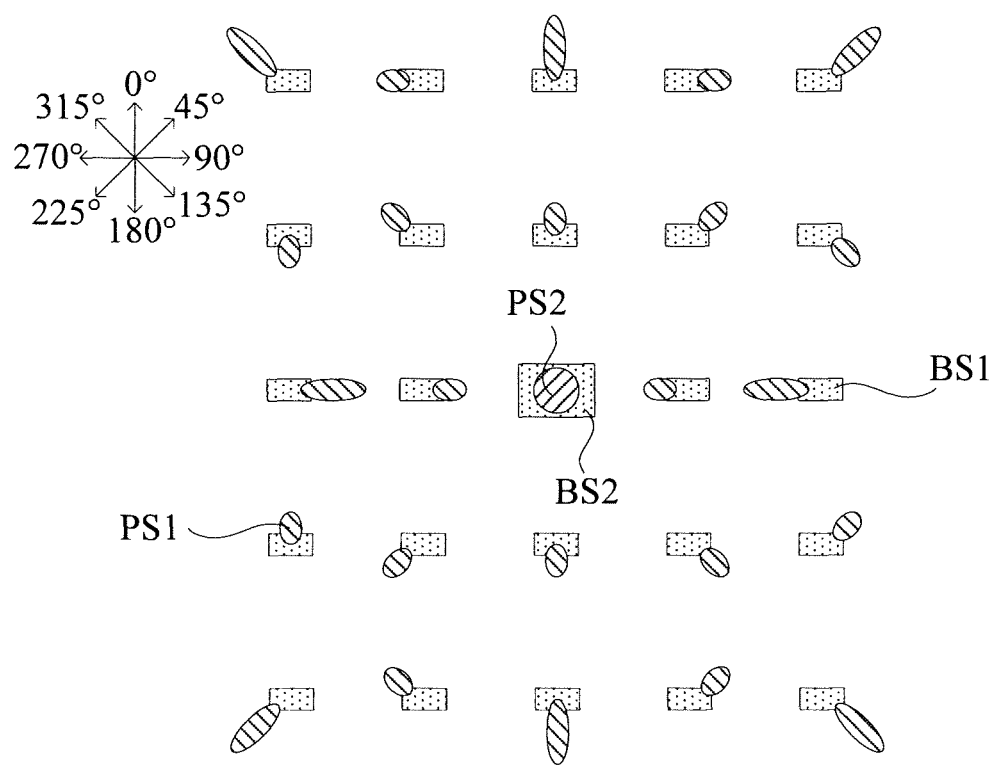
FIG. 3 is a schematic diagram showing the arrangement method of a first spacer in embodiments of the present disclosure.

FIG. 3 is a schematic view showing the arrangement method of a first spacer PS1 in an embodiment of the present disclosure. Referring to FIG. 3, FIG. 3 shows a manner of setting a first spacer PS1 and a first boss BS1 in a panel region Ux. The panel region Ux is a region which has a preset shape and a preset area in a plane of the display panel, for example, a region composed of 16 rows and 16 columns of sub-pixels closely arranged in the display region of the display panel. As shown in FIG. 3, the first spacer PS1 and the first boss BS1 which are disposed corresponding to each other are one support group. FIG. 3 shows 23 support groups arranged in 5 rows and 5 columns (the support group is vacant at row 3, column 3 where the second spacer PS2 and the second boss BS2 corresponding to each other are provided). The arrangement spacing between first bosses BS1 in rows and columns is the same. Each of the first spacers PS1 is constituted by a protrusion PS1x whose orthographic projection radiates toward the outside of the reference region. The topmost row in FIG. 3 is the first row, the leftmost column in FIG. 3 is the first column, and the effective misalignment range "45°: 0-10 um" indicates that the support group can achieve the expected supporting effect with the misalignment distance of the second substrate 11 relative to the first substrate 12 in a 45° direction within the range of 0 to 10 μm. The effective misalignment ranges of the respective support groups shown in FIG. 3 are shown in the following table 1:

TABLE 1

| The effective misalignment range schedule for each support group | | | | | |
|---|---|---|---|---|---|
| | Column 1 | Column 2 | Column 3 | Column 4 | Column 5 |
| 1 | 315°: 0~20 um | 270°: 0~10 um | 0°: 0~20 um | 90°: 0~10 um | 45°: 0~20 um |
| 2 | 180°: 0~10 um | 315°: 0~10 um | 0°: 0~10 um | 45°: 0~10 um | 135°: 0~10 um |
| 3 | 90°: 0~20 um | 90°: 0~10 um | | 270°: 0~10 um | 270°: 0~20 um |
| 4 | 0°: 0~10 um | 225°: 0~10 um | 90°: 0~10 um | 135°: 0~10 um | 45°: 0~10 um |
| 5 | 225°: 0~20 um | 315°: 0~10 um | 90°: 0~20 um | 45°: 0~10 um | 135°: 0~20 um |

Based on the above arrangement, the 23 support groups in the panel region Ux can satisfy the required support effect for the substrate misalignment with a misalignment distance less than or equal to 20 micrometers in various directions in the range of 0 to 360°, which helps prevent the second spacer PS2 in the panel region Ux from damaging the surface of the second substrate 12 when the misalignment occurs. On the basis of this, the arrangement mode of the panel region Ux as shown in FIG. 3 can be applied to each panel region Ux in the display region of the liquid crystal display panel, thereby helping avoid the occurrence of light leakage and so on caused by the alignment film being scratched by the spacer in the liquid crystal display panel, and improving the reliability of related display products. It can be seen that the second spacer PS2 in each panel region Ux in this embodiment is surrounded by more than one first spacer PS1, whereby each second spacer PS2 will not contact the second side surface of the second substrate 12 when a misalignment occurs.

Figure 4:
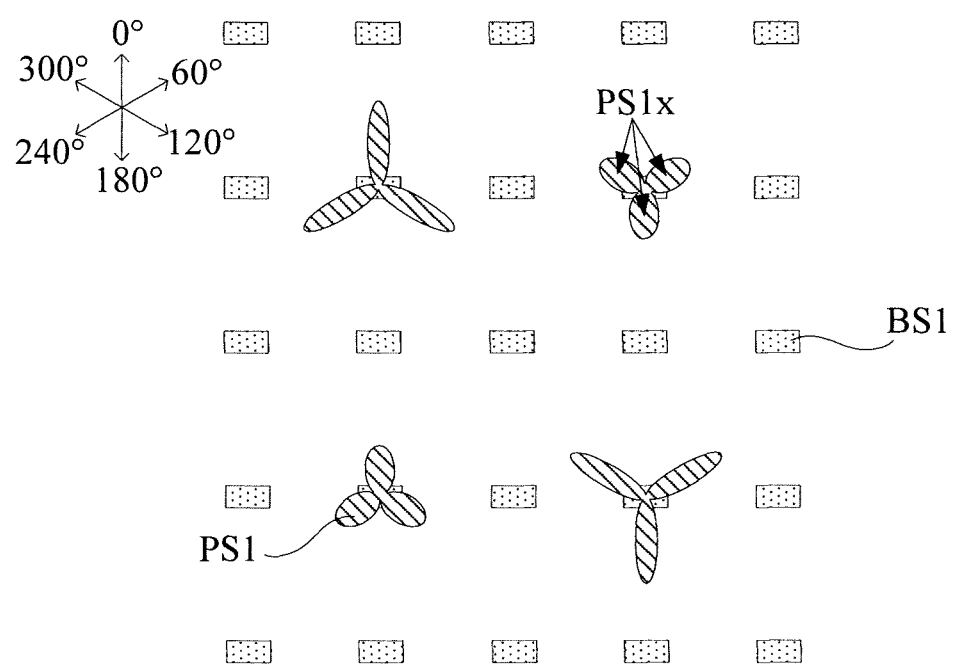
FIG. 4 is a schematic diagram showing the arrangement method of a first spacer in embodiments of the present disclosure.

FIG. 4 is a schematic view showing the arrangement of a first spacer in embodiments of the present disclosure. Referring to FIG. 4, in the panel region Ux shown, 4 of the 25 first bosses BS1 arranged in 5 rows and 5 columns are correspondingly provided with a first spacer PS1. Each spacer PS has three protrusions PS1x. The angle between any two of the three protrusions PS1x is 120°. In the support group consisting of four first spacers PS1:

In the upper left support group, the effective misalignment ranges of the three protrusions PS1x included in the first spacer PS1 are: "0: 0~20 μm", "120°: 0~20 μm", and "240°: 0~20 um".

In the upper right support group, the effective misalignment ranges of the three protrusions PS1x included in the first spacer PS1 are: "60°: 0~10 um", "180°: 0~10 um", and "300°: 0~10 um".

In the lower left support group, the effective misalignment ranges of the three protrusions PS1x included in the first spacer PS1 are: "0°: 0~10 um", "120°: 0~10 um", and "240°: 0~10 um".

In the lower right support group, the effective misalignment ranges of the three protrusions PS1x included in the first spacer PS1 are: "600: 0~20 um", "180°: 0~20 um", and "300°: 0~20 um".

Based on the above arrangement, the embodiment of the present disclosure may enable the support group in the panel region Ux to satisfy the required support effect for the substrate misalignment with a misalignment distance less than or equal to 20 micrometers in various directions in the range of 0 to 360°, which helps prevent the second spacer PS2 in the panel region Ux from damaging the surface of the second substrate 12 when a misalignment occurs. On the basis of this, the arrangement mode of the panel region Ux as shown in FIG. 4 can be applied to each panel region Ux in the display region of the liquid crystal display panel, thereby helping avoid the occurrence of light leakage and so on caused by the alignment film being scratched by the spacer in the liquid crystal display panel and improving the reliability of related display products.

Figure 5:
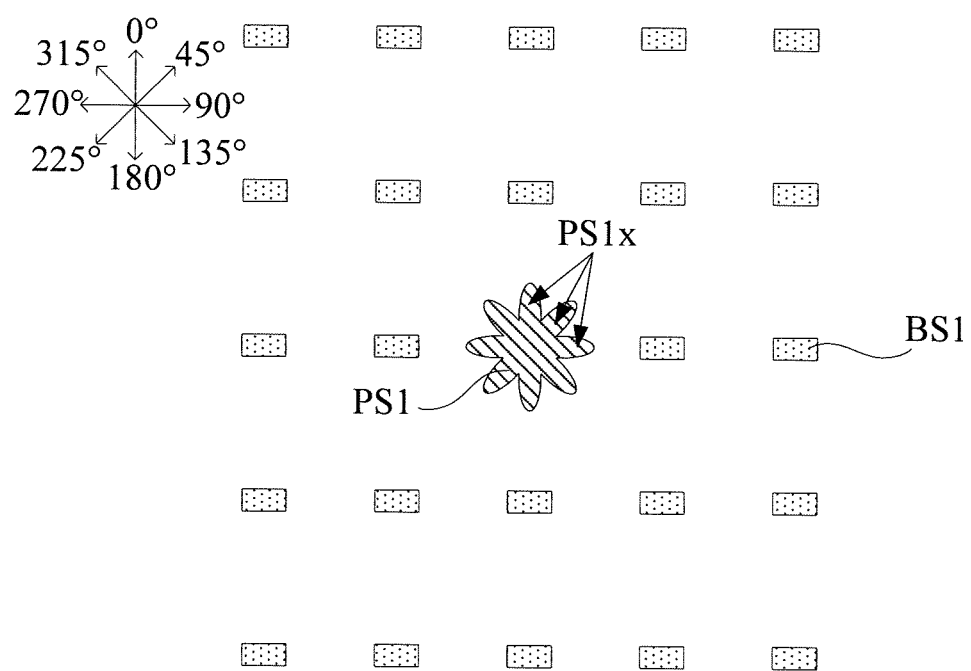
FIG. 5 is a schematic diagram showing the arrangement method of a first spacer in embodiments of the present disclosure.

FIG. 5 is a schematic view showing the arrangement of a first spacer in embodiments of the present disclosure. Referring to FIG. 5, in the panel region Ux shown, only one of the 25 first bosses BS1 arranged in 5 rows and 5 columns is correspondingly provided with the first spacer PS1. Each of the first spacers PS has eight protrusions PS1x. The effective misalignment ranges of the eight protrusions PS1x are: "0: 0~20 um", "45°: 0~20 um", "90°: 0~20 um", "135°": 0~20 um", "180°: 0~20 um", "225°: 0~20 um", "270°: 0~20 um", "315°: 0~20 um". Therefore, the embodiment of the present disclosure can enable the support group in the panel region Ux to satisfy the required support function for the substrate misalignment with a misalignment distance less than or equal to 20 micrometers in various directions in the range of 0 to 360° in another manner, which helps prevent the second spacer PS2 in the panel region Ux from damaging the surface of the second substrate 12 in case of misalignment. On the basis of this, the arrangement mode of the panel region Ux as shown in FIG. 5 can be applied to each panel region Ux in the display region of the liquid crystal display panel, thereby helping avoid the occurrence of light leakage and so on caused by the alignment film being scratched by the spacer in the liquid crystal display panel, and improving the reliability of related display products.

The arrangement manners shown in FIG. 3, FIG. 4, and FIG. 5 are taken as an example to describe an optional arrangement manner for the support group in the display panel:

Regarding the number of types of the extending directions (i.e., the target direction) of the protrusions PS1x in the panel region Ux, there are 8 types, 0°, 45°, 90°, 135°, 180°, 225°, 270°, and 315°, in FIG. 3 and FIG. 5. In FIG. 4, there are 6 types, 0°, 60°, 120°, 180°, 240°, and 300°. Since the protrusions PS1x in the panel region Ux in FIG. 3 and FIG. 5 are distributed relatively densely along each extending direction, it is generally more advantageous to deal with substrate misalignment in each direction within the range of 0 to 360°, and the situation where the support effect is deteriorated in some directions less likely to happen. In general, the number of types of extending directions of the protrusions PS1x in any one of the panel regions Ux may be set to be greater than 2, and each of the extending directions is dispersed in different orientations (for example, an angle between any two extending directions may be greater than or equal to a preset angle), so as to ensure the minimum support effect in the application scenario where the substrate misalignment direction is within the range of 0-360°. In one example, when the number of types of the extending directions of the protrusions PS1x in any one of the panel regions Ux is n (2<n<12), an angle between every two adjacent extending directions may be set to be greater than or equal to (360/n−10)° so that the support group in the display panel is sufficient to handle substrate misalignment in all directions. In still another example, when the number of types of the extending directions of the protrusions PS1x in any one of the panel regions Ux is n (n>3), an angle between every two adjacent extending directions may be set to (360/n)°, so that the protrusions PS1x in the panel region Ux are more evenly distributed along each extending direction, which can achieve the desired supporting effect within a larger angle range compared to the other conditions in which the number of types of the extending directions is static.

Regarding the number of the protrusions PS1x of the first spacer PS1 and the number of the first spacers PS1 in each panel region Ux, FIG. 3 and FIG. 5 respectively show two extreme cases. In the extreme case where FIG. 3 is taken as an example, the number of the first spacers PS1 in each panel region Ux is greater than 2, and the number of the protrusions PS1x in each of the first spacers PS1 is 1. In the extreme case where FIG. 5 is taken as an example, the number of the first spacers in each panel region Ux is 1, and the number of the protrusions PS1x in each of the first spacers PS1 located in the panel region Ux is greater than 2.

Compared with the mode shown in FIG. 5, the mode shown in FIG. 3 can provide a more even support force distribution between the first substrate 11 and the second substrate 12 when a misalignment occurs, and is more suitable for being applied in application scenarios where each sub-pixel region respectively include one first boss BS1 (the aperture ratio effect for each sub-pixel region is at an equal level, and the situation where the aperture ratio for a certain sub-pixel region is much lower than the surroundings is less likely to happen). Compared with the manner shown in FIG. 3, the arrangement manner shown in FIG. 5 can reduce the number of the first spacers PS1 and reduce the spacing between the adjacent first spacers PS1, thereby facilitating simplification of the manufacturing process of the first spacer PS1, reducing the process difficulty, and improving the reliability. The mode shown in FIG. 4 is between the mode shown in FIG. 3 and the mode shown in FIG. 5, and thus has some advantages of both. In one example, the plurality of first spacers PS1 disposed on the first side of the first substrate 11 has the same shape and size, and the plurality of first spacers PS1 is arranged with the same spacing in each direction (for example, each has a fixed arrangement spacing in each direction). Thereby, the manufacturing process of the first spacer PS1 can be greatly simplified based on the even arrangement of the first spacers PS1, which reduces the process difficulty and improves the reliability.

It can be seen that the length of the minor axis of the elliptical protrusion PS1x shown in FIG. 3, FIG. 4, and FIG. 5 (the minor-axis direction R2 is a direction perpendicular to the direction of the orthographic projection of the protrusion PS1x radiating toward the outside of the reference region, that is, the direction in which the minor axis is located) is substantially uniform. That is, the length of the orthographic projection of each of the protrusions PS1x included in the plurality of first spacers PS1 provided on the first side of the first substrate 11 in the minor axis direction R2 is the same. Thereby, a minor axis length of the protrusion PS1x which is advantageous for improving the contact effect between the first spacer PS1 and the first boss BS1 when a misalignment occurs can be determined in advance by the height distribution of the second side surface of the second substrate, in order to guarantee the contact area between the first spacer PS1 and the first boss BS1 and at the same time avoid the influence of the protruded structure around the first boss BS1 on the first spacer. In yet another example, the orthographic projection of each of the protrusions PS1x on the plane of the first substrate 11 may be aligned in the minor-axis direction R2 with the edge of the reference region. For example, the difference between the length of the orthographic projection (for example, the minor-axis length of the ellipse) of the extending direction of any one of the orthographic protrusions PS1x in the minor-axis direction R2 (for example, the direction in which the minor axis of the ellipse is located) and the length of the orthographic projection of its corresponding reference region may be set smaller than a preset length (for example, 0.1 to 5 um), which helps increase the contact area between the first spacer PS1 and the first boss BS1 when a misalignment occurs.

Figure 6:
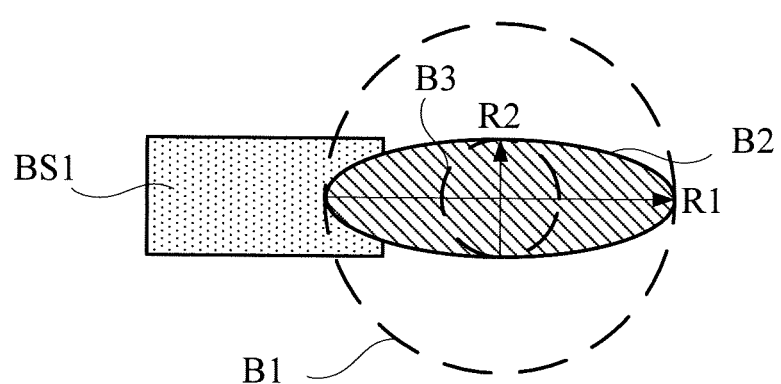
FIG. 6 is a schematic diagram of a comparison of protrusions of different shapes in embodiments of the present disclosure.

FIG. 6 is a schematic diagram of a comparison of protrusions PS1x of different shapes in an embodiment of the present disclosure. Referring to FIG. 6, FIG. 6 shows a first spacer PS1 composed of three protrusions PS1x with different shapes and a correspondingly disposed first boss BS1. The shapes of the protrusion B1 and the protrusion B3 are circles, the protrusion B2 is an eclipse, and the centers of the protrusion B1, the protrusion B2, and the protrusion B3 coincide with each other. Referring to FIG. 6, by comparing the protrusion B2 with the protrusion B3, it can be seen that the effective misalignment range of the protrusion B2 is obviously larger than the effective misalignment range of the protrusion B3. By comparing the protrusion B2 with the protrusion B1, it can be seen that the protrusion B2 has a smaller orthographic projection area and a shorter orthographic projection length in the up-down direction than the protrusion B1 in the situation where the effective misalignment ranges are substantially the same. Thus, compared with the first spacer PS1 constituted by the protrusion B1, the first spacer PS1 constituted by the protrusion B2 is made of less material, and is less susceptible to the protruded structure around the first boss BS. Its top surface will not be depressed under the pressure of the first boss BS1. Taking this as an example, it can be seen that the design that the shape of the orthographic projection of the protrusion PS1x is a shape radiating toward the outside of the reference region is more advantageous to obtain a good effect.

Figure 7:
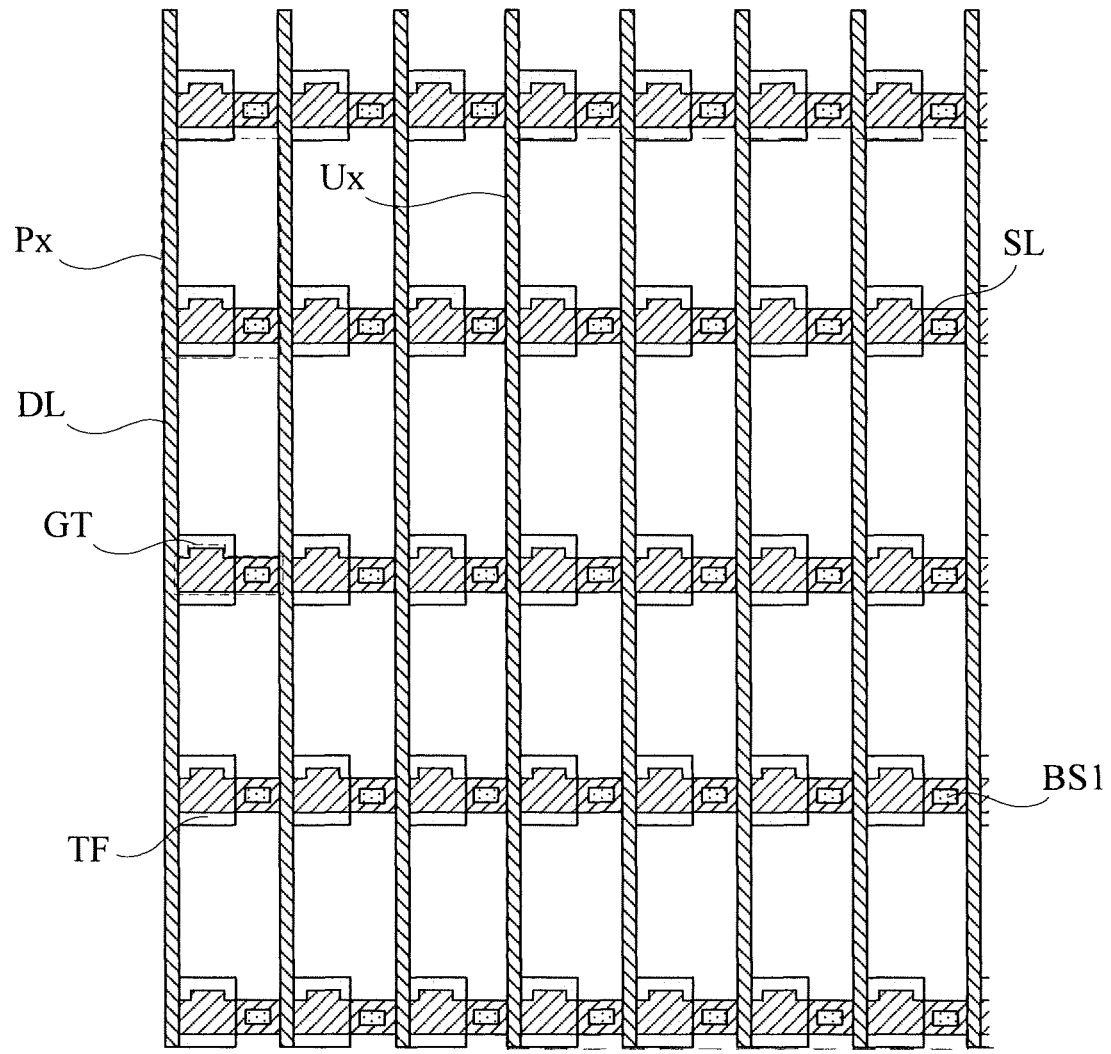
FIG. 7 is a structural schematic diagram of a second side of a second substrate in embodiments of the present disclosure.

FIG. 7 is a schematic structural view of a second side of a second substrate in an embodiment of the present disclosure. Referring to FIG. 7, the second side of the first substrate is provided with a plurality of rows of gate lines SL and a plurality of columns of data lines DL. The plurality of rows of gate lines SL and the plurality of columns of data lines DL intersect to define a plurality of rows and columns of sub-pixel regions Px. The gate lines SL between two adjacent columns of data lines DL in each of the sub-pixel regions Px form a gate line region GT, and a transistor region TF for arranging transistors in the sub-pixel region Px partially overlaps the gate line region GT. Further, the first boss BS1 is disposed in each of the sub-pixel regions Px, and the orthographic projection region of the first boss BS1 is located inside the gate line region GT and outside the transistor region TF. As an example, one panel region Ux composed of 4 rows and 4 columns of sub-pixel regions Px is shown in FIG. 7.

Based on the first bosses BS1 arranged in a plurality of rows and columns in FIG. 7, the arrangement manner of the first spacers PS1 shown in FIGS. 3, 4, and 5, for example, may be applied such that the plurality of first spacers PS1 disposed on the first side of the second substrate 12 is also arranged in a plurality of rows along the arrangement direction of the gate lines, and is arranged in a plurality of columns along the arrangement direction of the data lines. Taking this as an example, the first spacers PS1 may be arranged in a manner corresponding to the arrangement manner of the sub-pixel regions Px (for example, the reference region of each of the first spacers PS1 is respectively located at the same position in the different sub-pixel regions Px). On the one hand, the existing structure in the sub-pixel region Px can be used to provide the first boss BS1, on the other hand, it is also helpful to avoid difficulty in setting the first boss BS1 due to non-corresponding arrangement manner. Further, for the first boss BS1 without a corresponding first spacer PS1, a vacancy may be set in the corresponding sub-pixel region Px. Based on the situation where the reference region includes at most one first spacer PS1 in each sub-pixel region Px, the degree of the influence of the first spacer PS1 on the aperture ratio can be reduced.

For the second spacer PS2 and the second boss BS2 facing each other, each of the second spacers PS2 may be disposed to be surrounded by more than one of the first spacers PS1. For example, the number of the first spacers PS1 in the peripheral region of each of the second spacers PS2 may be set to be greater than or equal to a preset number (for example, 2 to 10). The peripheral region of the second spacer PS2 is a region having a preset shape and a preset area centered on the center of the second spacer PS2, for example, five consecutive 5 rows and 5 columns of sub-pixel regions Px centered on the second spacer PS2. Thereby, each of the second spacers PS2 will not contact the second side surface of the second substrate 12 when a misalignment occurs.

In addition, for the first spacer PS1 including, for example, two or more protrusions PS1x illustrated in FIGS. 4 and 5, the first boss BS1 corresponding thereto may be disposed within the sub-pixel region Px inside the gate line region and outside the transistor region, so that the characteristic of this portion, which has relatively large area and is relatively flat, can be utilized to ensure the contact effect between the first spacer PS1 and the first boss BS1 having a relatively large size.

Optionally, the structure other than the first boss BS1 shown in FIG. 7 can be disposed on the second substrate 12 within an achievable range, that is, a transformation of the technical solution of the embodiments of the present disclosure can be implemented by converting the types of the first substrate 11 and the second substrate 12.

For any one of the above display panels, it may further include a black matrix layer (not shown in the drawings) disposed on the first substrate 11 or the second substrate 12. In order to avoid the influence of the first spacer PS1 and the second spacer PS2 on the display effect, the orthographic projection regions of each of the first spacers PS1 and each of the second spacers PS2 in the plane of the display substrate may all be located within the orthographic projection region of the black matrix layer.

Figure 8:
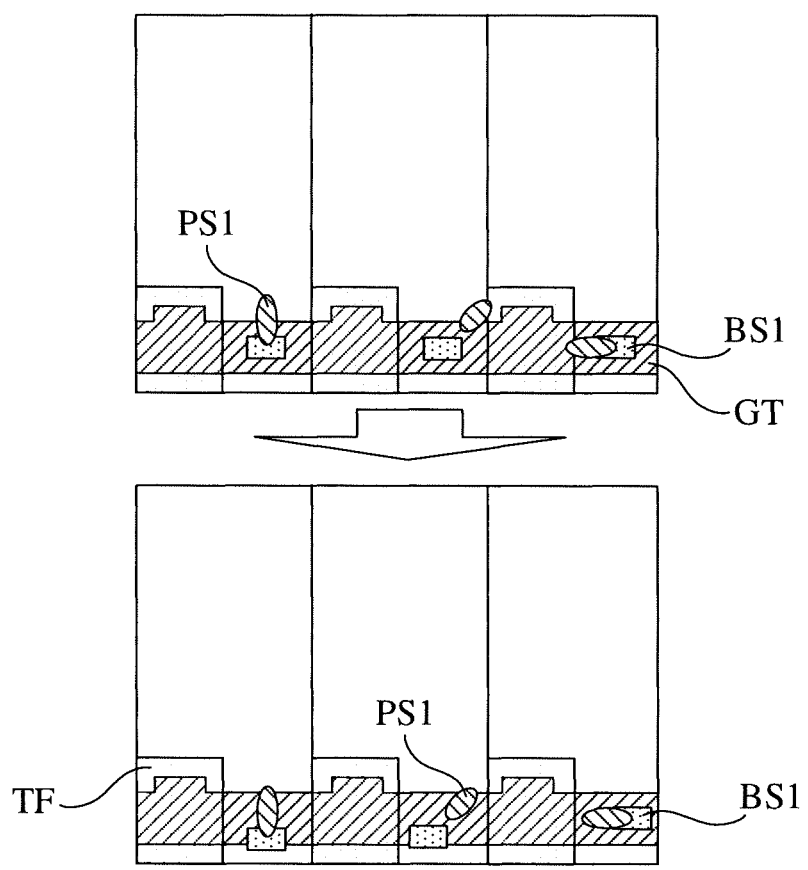
FIG. 8 is a schematic diagram showing the arrangement method of a first spacer and a first boss in embodiments of the present disclosure.

FIG. 8 is a schematic view showing the arrangement manner of a first spacer PS1 and a first boss BS1 in an embodiment of the present disclosure. Referring to FIG. 8, the upper half (i.e., the portion above the arrow) of FIG. 8 shows the arrangement manner of the first spacer PS1 and the first boss BS1 in several sub-pixel regions Px, which are all realized by disposing the first boss BS1 in a fixed position within the sub-pixel region Px. The lower half (i.e., the portion below the arrow) of FIG. 8 shows an arrangement manner to help enlarge the aperture ratio, which sets the center of the graphic (for example, at least one of a geometric center, a center of gravity, an orthocenter, an inner center, and an outer center, which is simply referred to as a set position of the first spacer PS1) formed by the orthographic projections of the first spacer PS1 and the first boss BS1 in the plane of the display panel at a fixed position within the sub-pixel region Px. It can be seen that the area of the first spacer PS1 beyond the gate line region GT in the upper half of FIG. 8 is relatively large, and a portion thereof also falls within the transistor region TF, while the lower half of FIG. 8 is almost completely located within the gate line region GT. Since the gate line region GT itself is located within the coverage of the black matrix layer, the arrangement manner of the lower half of FIG. 8 is more advantageous for increasing the pixel aperture ratio. In general, the set position of the first spacer in the plane of the display panel can be equally spaced in each direction, so that a larger pixel aperture ratio can be obtained under the same conditions.

Furthermore, it can be seen that the first spacers PS1 located on the two sides in FIG. 8 are partially located within their reference regions (the shape of the orthographic projection of each of the protrusions PS1x on the plane of the first substrate 11 is a shape that radiates outward from the inside of the reference region called the first type of spacer), it can be understood that the first type of spacer has the ability to cope with the substrate misalignment with a relatively short misalignment distance. The first spacer PS1 located in the middle in FIG. 8 is completely disposed outside the reference region thereof (each of the protrusions PS1x is in a shape that radiates from the outside of the reference region toward a direction away from the reference region called the second type of spacer). It can be understood that the second type of spacer does not have the ability to deal with the substrate misalignment with a relatively short misalignment distance, but it can enhance the ability of the display panel to cope with the substrate misalignment with a relatively short misalignment distance. In general, in the display panel, at least a portion of all the first spacers may be disposed as the first type of spacers, or at least a portion of all the first spacers may be disposed as the second type of spacers, or at least a portion of all the first spacers may be disposed as the first and the second type of spacers. The arrangement of the first type of spacers can enhance the ability of the display panel to deal with the substrate misalignment with a relatively short misalignment distance, and the second type of spacer can enhance the capability of the display panel to deal with the substrate misalignment with a relatively long misalignment distance. The combination can achieve more diverse arrangement manners for the first spacers.

Based on the same inventive idea, embodiments of the present disclosure provide a display device including any one type of the display panels abovementioned. The display device may any device for display, such as a display, a television, or the like.

Figure 9:
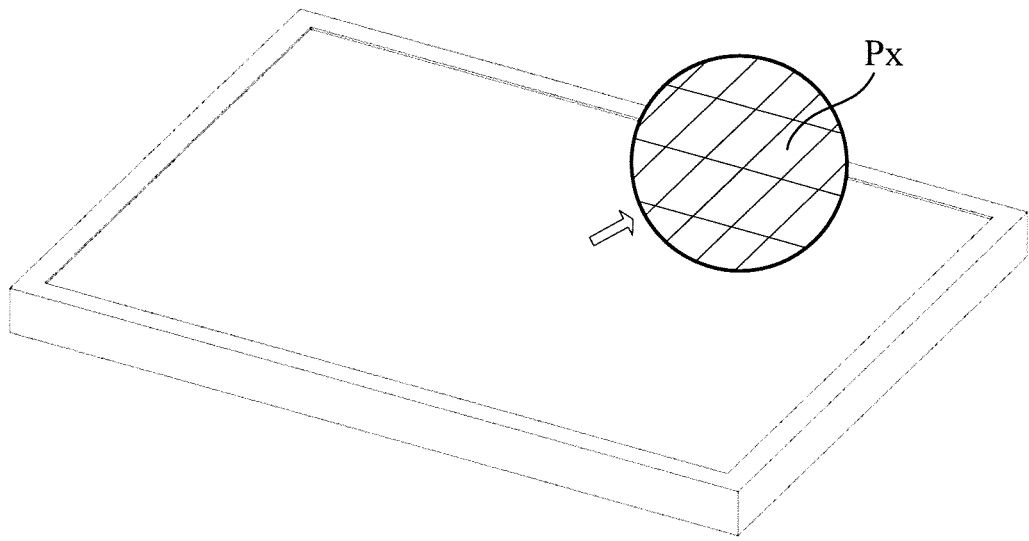
FIG. 9 is a structural schematic diagram of a terminal according to embodiments of the present disclosure.

Based on the same inventive idea, embodiments of the present disclosure further provide a terminal. The terminal may include any type of the above-mentioned display panels. The terminal in the embodiments of the present disclosure may be any product or component having a display function, such as a mobile phone, a tablet computer, a television, a display, a notebook computer, a digital photo frame, a navigator, and the like. As an example, FIG. 9 is a schematic structural diagram of a terminal according to an embodiment of the present disclosure. The terminal includes any one of the above-described display panels, and the display panel provides the terminal with sub-pixel regions Px disposed in a row and column in a display region. The display panel in the terminal also has the corresponding advantages based on the advantages of the included display panel.

Only the structure for explaining the technical solution is shown in the drawings of the present disclosure; in the real products, it is also possible to add, delete, or modify on the basis of the drawings of the present disclosure within a possible range without affecting the implementation of the technical solution.

The foregoing descriptions are only embodiments of the present disclosure, and are not intended to limit the present disclosure. Within the spirit and principles of the disclosure, any modifications, equivalent substitutions, improvements, etc., are within the protective scope of the appended claims of the present disclosure.

What is claimed is:

1. A display panel, comprising a first substrate and a second substrate; wherein a side of the first substrate in a thickness direction faces a side of the second substrate in a thickness direction;
    the first substrate comprises a plurality of first spacers and a plurality of second spacers on a side facing the second substrate, a height of the first spacer being smaller than a height of the second spacer;
    the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than a height of the second spacer; and
    each of the first spacers comprises at least three protrusions which are joined together, and a length of an orthographic projection of each of the protrusions on a plane of the first substrate in a target direction is longer than lengths thereof in other directions; the display panel comprises a plurality of panel regions on a plane of the display panel, the number of types of the target directions of the protrusions in any one of panel regions is n, n being greater than 2, and each of the protrusions is configured to cope with a misalignment between the first substrate and the second substrate in the target direction of the protrusion.

2. The display panel of claim 1, wherein the target direction is a direction away from a reference region, the orthographic projection of each of the at least one protrusion on the plane of the first substrate is of a shape radiating along the target direction, and the reference region is a region where an orthographic projection of the first boss corresponding to the first spacer on the plane of the first substrate is.

3. The display panel of claim 1, wherein target directions of any two protrusions in any one of the panel regions are different.

4. The display panel of claim 2, wherein an angle between each adjacent two of the target directions is 360/n degrees.

5. The display panel of claim 3, wherein the number of the first spacers in each of the panel regions is 1, and the number of the protrusions in the first spacer in each of the panel regions is greater than 2.

6. The display panel of claim 2, wherein in at least one of the first spacers, the orthographic projection of each of the at least three protrusion on the plane of the first substrate is of a shape radiating outward from an inside of the reference region along the target direction;

wherein in at least one of the first spacers, the orthographic projection of each of the at least three protrusion on the plane of the first substrate is of a shape radiating from an outside of the reference region along the target direction.

7. The display panel of claim 1, wherein the plurality of first spacers have the same shape and size, and the plurality of first spacers are equally spaced in each direction.

8. The display panel of claim 2, wherein a plane of the display panel comprises a plurality of sub-pixel regions, a reference region of each of the first spacers in different sub-pixel regions is respectively at the same position.

9. The display panel of claim 1, wherein one of the first substrate and the second substrate is provided with a plurality of rows of gate lines and a plurality of columns of data lines, the plurality of first spacers are arranged in a plurality of rows in an arrangement direction of the gate lines, and the plurality of first spacers are arranged in a plurality of columns in an arrangement direction of the data lines.

10. The display panel of claim 2, wherein a plane of the display panel comprises a plurality of sub-pixel regions, and each of the sub-pixel regions has at most one reference region of the first spacer.

11. The display panel of claim 1, wherein each of the second spacers is surrounded by more than one of the first spacers.

12. The display panel of claim 1, wherein a plane of the display panel comprises a plurality of sub-pixel regions, each of the sub-pixel regions comprises a gate line region and a transistor region; and each of the first spacers comprises more than two of the protrusions corresponds to the first bosses within the gate line region and outside the transistor region.

13. The display panel of claim 1, wherein the orthographic projection of each of the at least three protrusion on the plane of the first substrate is an ellipse.

14. The display panel of claim 1, wherein the display panel further comprises a black matrix layer, the black matrix layer is on one of the first substrate and the second substrate; an orthographic projection region of each of the first spacers and an orthographic projection region each of the second spacers on a plane of the display panel are within an orthographic projection region of the black matrix layer on the plane of the display panel.

15. The display panel of claim 1, wherein set positions of the plurality of first spacers in a plane of the display panel are equally spaced in each direction, the set position is a center of a graphic formed by an orthographic projection of the first spacer and an orthographic projection of the corresponding first boss on the plane of the display panel.

16. A display device, comprising a display panel, wherein the display panel comprises a first substrate and a second substrate; wherein a side of the first substrate in a thickness direction faces a side of the second substrate in a thickness direction;
the first substrate comprises a plurality of first spacers and a plurality of second spacers on a side facing the second substrate, a height of the first spacer being smaller than a height of the second spacer; and
the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than a height of the second spacer; and
each of the first spacers comprises at least three protrusions which are joined together, and a length of an orthographic projection of each of the protrusions on a plane of the first substrate in a target direction is longer than lengths thereof in other directions; the display panel comprises a plurality of panel regions on a plane of the display panel, the number of types of the target directions of the protrusions in any one of panel regions is n, n being greater than 2, and each of the protrusions is configured to cope with a misalignment between the first substrate and the second substrate in the target direction of the protrusion.

17. The display panel of claim 2, wherein the orthographic projection of each of the at least three protrusion on the plane of the first substrate is aligned with an edge of the reference region in a direction perpendicular to the target direction.

18. The display panel of claim 1, wherein the target direction is a direction away from a reference region, the orthographic projection of each of the at least three protrusion on the plane of the first substrate is of a shape radiating along the target direction, and the reference region is a region where an orthographic projection of the first boss corresponding to the first spacer on the plane of the first substrate is;
the orthographic projection of each of the at least three protrusion on the plane of the first substrate is aligned with an edge of the reference region in a direction perpendicular to the target direction;
target directions of any two protrusions in any one of the panel regions are different;
an angle between each adjacent two of the target directions is 360/n degrees;
the orthographic projection of each of the at least three protrusion on the plane of the first substrate is an ellipse;
in at least one of the first spacers, the orthographic projection of each of the at least three protrusion on the plane of the first substrate is of a shape radiating outward from an inside of the reference region along the target direction; and
in at least one of the first spacers, the orthographic projection of each of the at least three protrusion on the plane of the first substrate is of a shape radiating from an outside of the reference region along the target direction.

19. A terminal, comprising a display panel, wherein the display panel comprises a first substrate and a second substrate; wherein a side of the first substrate in a thickness direction faces a side of the second substrate in a thickness direction;
the first substrate comprises a plurality of first spacers and a plurality of second spacers on a side facing the second substrate, a height of the first spacer being smaller than a height of the second spacer;
the second substrate comprises a plurality of first bosses and a plurality of second bosses on a side facing the first substrate, wherein each of the first spacers corresponds to at least one of the first bosses, each of the second spacers faces one of the second bosses, and a sum of a height of the first boss and a height of the first spacer is greater than a height of the second spacer; and
each of the first spacers comprises at least three protrusions which are joined together, and a length of an orthographic projection of each of the protrusions on a plane of the first substrate in a target direction is longer than lengths thereof in other directions; the display panel comprises a plurality of panel regions on a plane of the display panel, the number of types of the target directions of the protrusions in any one of panel regions is n, n being greater than 2, and each of the protrusions is configured to cope with a misalignment between the first substrate and the second substrate in the target direction of the protrusion.

* * * * *